United States Patent
Yamagishi

(10) Patent No.: US 10,968,878 B2
(45) Date of Patent: Apr. 6, 2021

(54) CIRCUIT AND METHOD FOR COIL CURRENT CONTROL

(71) Applicant: SEMICONDUCTOR COMPONENTS INDUSTRIES, LLC, Phoenix, AZ (US)

(72) Inventor: Mikio Yamagishi, Fukaya (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 16/843,225

(22) Filed: Apr. 8, 2020

(65) Prior Publication Data

US 2020/0232437 A1 Jul. 23, 2020

Related U.S. Application Data

(63) Continuation of application No. 16/159,760, filed on Oct. 15, 2018, now Pat. No. 10,648,442.

(51) Int. Cl.
| | |
|---|---|
| *F02P 3/04* | (2006.01) |
| *F02P 3/055* | (2006.01) |
| *F02P 9/00* | (2006.01) |
| *H01T 15/00* | (2006.01) |

(52) U.S. Cl.
CPC .............. *F02P 3/0435* (2013.01); *F02P 3/055* (2013.01); *F02P 9/002* (2013.01); *H01T 15/00* (2013.01)

(58) Field of Classification Search
CPC .......... F02P 3/0435; F02P 3/055; F02P 9/002; F02P 11/00; F02P 3/053; H01T 15/00; H02P 13/00
See application file for complete search history.

(56) References Cited

U.S. PATENT DOCUMENTS

| | | | | |
|---|---|---|---|---|
| 5,521,809 A | * | 5/1996 | Ashley | H02J 1/102 363/71 |
| 5,777,867 A | * | 7/1998 | Hongu | G02B 6/2551 361/257 |
| 7,843,178 B1 | * | 11/2010 | Houk | H02M 3/156 323/222 |
| 8,908,393 B2 | * | 12/2014 | Ye | H02M 3/33592 363/21.06 |
| 9,525,273 B1 | | 12/2016 | Yamamoto et al. | |
| 9,800,024 B2 | | 10/2017 | Obe et al. | |
| 2005/0270804 A1 | * | 12/2005 | Liu | H02M 1/36 363/16 |
| 2009/0133666 A1 | | 5/2009 | Thomas | |
| 2015/0252754 A1 | * | 9/2015 | Lajda | F02P 5/1556 123/179.16 |

(Continued)

*Primary Examiner* — Joseph J Dallo

(74) *Attorney, Agent, or Firm* — Brake Hughes Bellermann LLP

(57) ABSTRACT

Circuits and methods to control a current in a coil are disclosed. The circuit and methods provide over-dwell protection and soft shut-down functionality to safely discharge the coil. The safe discharge of the coil is facilitated by a soft-start ramp signal that reduces the coil current gradually by controlling a switching device according. A profile of the soft-start ramp signal over time determines the gradual reduction. The profile of the soft-start ramp signal can be adjusted to set (i) an over-dwell period of the coil current, after which the coil current is shut down, and (ii) a soft shut-down period, over which the coil current is gradually reduced.

20 Claims, 9 Drawing Sheets

(56) References Cited

U.S. PATENT DOCUMENTS

| | | | |
|---|---|---|---|
| 2016/0281673 A1* | 9/2016 | Skowronek | F02P 3/0407 |
| 2016/0329807 A1* | 11/2016 | Daly | H02M 3/156 |
| 2016/0348633 A1* | 12/2016 | Skowronek | F02P 5/1516 |
| 2017/0063225 A1* | 3/2017 | Guo | H02M 3/158 |
| 2017/0141545 A1 | 5/2017 | Yamamoto et al. | |
| 2017/0232122 A1 | 8/2017 | Hancock | |
| 2017/0284358 A1* | 10/2017 | Skowronek | F02P 9/002 |

* cited by examiner

CIRCUIT AND METHOD FOR COIL CURRENT CONTROL

CROSS-REFERENCE TO RELATED APPLICATIONS

The present application is a continuation of U.S. patent application Ser. No. 16/159,760, filed on Oct. 15, 2018, the entire contents of which are hereby incorporated herein by reference.

FIELD OF THE DISCLOSURE

The present disclosure relates to electronic systems that charge/discharge a coil and more specifically to circuits and methods for controlling a current in the coil.

BACKGROUND

Systems that utilize a coil typically include circuits to protect the system from damage that could arise as the coil is charged and discharged. For example, overheating could result if a coil is charged and operated at a high current over a period that is too long. In another example, a kickback (i.e., flyback) voltage (e.g., voltage spike) could lead to an unwanted voltage breakdown (e.g., spark) if a coil is discharged over a period that is too short. Accordingly, new circuits and methods are needed to control a current in a coil.

SUMMARY

The present disclosure describes circuits and methods to control a current in a coil. The coil may be used as part of an ignition system and the circuit and method can provide over-dwell protection and soft shut-down functionality to safely discharge the coil without producing an unintentional spark. The circuits and methods generate a soft-start ramp signal that can adjust the coil current by controlling a switching device (e.g., insulated gate bipolar transistor) according to a profile (i.e., shape) of the soft-start ramp signal over time. The profile of the soft-start ramp signal can be adjusted to set an over-dwell period of the coil current, after which the coil current is shut down. The profile of the soft-start ramp signal can also be adjusted to set a soft shut-down period, over which the coil current is gradually reduced (e.g., to zero amperes).

In one aspect, the present disclosure describes a circuit for controlling a current in a coil. The circuit includes a capacitor connected between a source voltage (Vs) and an output node. The circuit also includes a first switching device that is connected between the voltage source and the output node. When the first switching device is in an ON state, the output node is coupled to the voltage source, and when the first switching device is in an OFF state, the output node is coupled to the voltage source through the capacitor. The circuit further includes a voltage-controlled current-source (VCCS) that is connected between the output node and a ground, the VCCS outputs a current that charges the capacitor so that when the first switching device is moved from the ON state to the OFF state, a voltage is generated at the output node that decreases over a period from Vs to a ground voltage according to a soft-start-profile.

In another aspect, the present disclosure describes a method for controlling a current in a coil that includes receiving a charge coil trigger signal, generating a soft-start ramp signal that has a voltage profile that decreases with time, and applying the soft-start ramp signal to a gate of a switching device to gradually shut down the current in the coil. The current in the coil is gradually shut down over a soft shut-down period and after an over-dwell period. Each period corresponds to the voltage profile of the soft-start ramp signal.

In a possible embodiment of the method, the step of generating a soft-start ramp signal includes coupling a first side of the capacitor to a source voltage and controlling a current charging the capacitor using a voltage controlled current source (VCCS). The VCCS is connected between a second side of the capacitor and a ground voltage and a voltage across the capacitor can be applied to the input of the VCCS to control the current charging the capacitor. The soft-start ramp signal is then output as the voltage at the second side of the capacitor.

In another aspect, the present disclosure describes a soft-start ramp generator. The soft-start ramp generator includes voltage source terminal, a ground terminal, and an output node. A capacitor is coupled between the voltage source terminal and the output node, and a voltage controlled current source (VCCS) is coupled between the output node and the ground terminal. The VCCS is configured to control the current through the capacitor based on the voltage across the capacitor so that a voltage at the output node decreases from a voltage at the voltage source terminal to a voltage at the ground terminal according to a soft-start profile.

In a possible embodiment of the soft-start ramp generator, the voltage at the output node of the soft-start ramp generator can be coupled to a switching device to control a current in a coil. The current in the coil is controlled to gradually decrease over a soft shut-down period after an over-dwell period.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
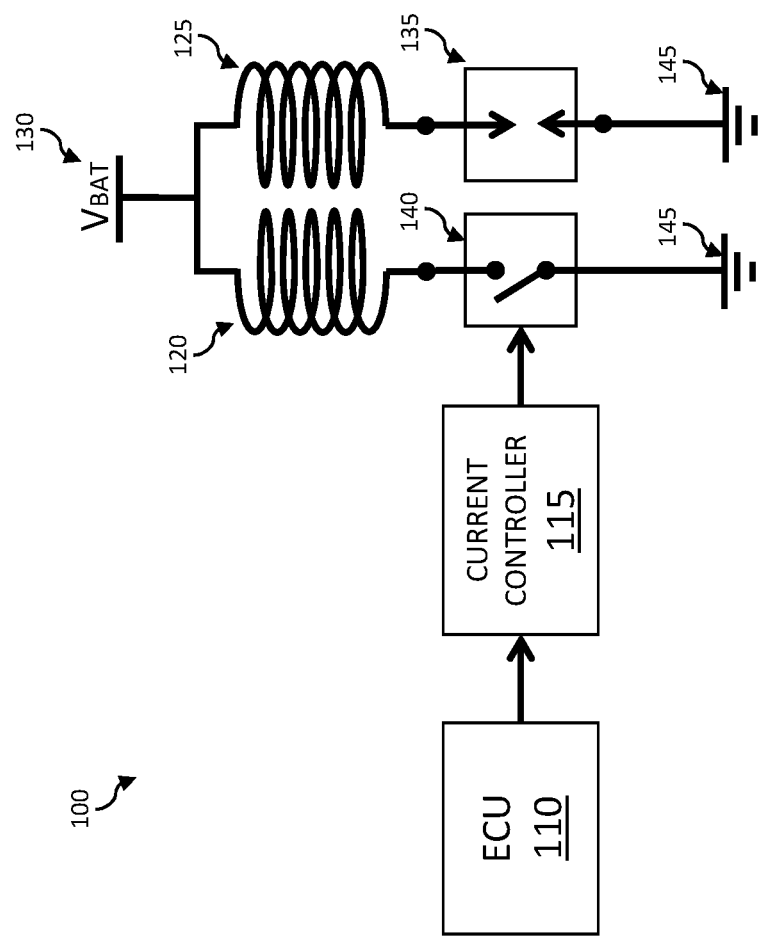
FIG. 1 is a block diagram of an ignition system according to a possible embodiment of the present disclosure.

Various systems may use a coil to store and supply energy. An example of such a system is shown in FIG. 1. Specifically, FIG. 1 illustrates a simplified block diagram of an ignition system 100 for an engine (e.g., in a vehicle). The ignition system produces a spark at a spark gap 135 in response to a control signal. In operation, a first signal (e.g., a rising edge of a pulse) is sent from an engine control unit (ECU) 110 to a current controller 115. In response to the first signal, the current controller 115 applies a signal to a switching device 140 to control its conduction to charge a coil 120. Specifically, the switching device 140 is configured to conduct so that a coil current to flows from voltage source (i.e., VBAT) 130 to a ground voltage 145 through the coil 120, After the coil 120 is charged, the ECU can send a second signal (e.g., a falling edge of a pulse) to the current controller 115. Based on this second signal the current controller 115 applies a signal to the switching device 140 to control its conduction to discharge the coil 120. Specifically, the switching device 140 is configured to cease conducting a coil current. The abrupt cessation of coil current produces a large kickback voltage across the coil 120. This voltage can be made even larger by inductively coupling the coil 120 to a second coil 125 (e.g., in a step-up transformer configuration). The voltage induced in the second coil 125 is coupled to a spark gap 135 and is large enough to overcome the breakdown voltage of the spark gap to produce a spark.

In certain circumstances, the first signal (i.e., ON signal) from the ECU 110 is either not followed by the second signal (OFF signal) or followed much later by the second signal. As a result, the coil current is allowed to charge to a large value without producing a spark. If the coil current is not shut down within some reasonable time period, the high coil current could cause damage to the ignition system (e.g., by overheating). Accordingly, to prevent damage, the coil can be discharged after a pre-determined over-dwell period (ODP).

To discharge the coil 120 the switching device 140 may be configured to abruptly stop conducting (i.e., hard shut down), but as described previously, a hard shut down can cause a spark at the spark gap 135. Because a discharge after an ODP is generally not correlated with normal operation, a spark produced by a hard shut down may be undesirable. In the example of an ignition system, a spark resulting from a hard shut down after an ODP could result in damage to and/or poor operation of the engine because it may not be correlated in time with the appropriate cycle (i.e., stroke) of the engine. In order to prevent the untimely spark, the switching device may be configured to discharge the coil 120 gradually (i.e., soft shut down) by reducing the coil current over a soft shut down (SSD) period.

The gradual discharge may be characterized as a current reduction over time that results induced coil voltage below a particular value. In other words, the change in current per unit time during a gradual discharge of a coil can be kept below a maximum value to prevent an induced voltage across the coil (i.e., coil having an inductance, L) from exceeding a maximum value. In particular, a gradual discharge (i.e., gradual shut down, soft shut down) of a coil may refer to a coil current profile that conforms to:

$$dI/dt < V_{MAX}/L$$

In an ignition system, for example, a gradual reduction of coil current (i.e., soft shut down) may be at a rate that is at or below a maximum current reduction rate of about 2.5 amperes per millisecond (A/ms). In some embodiments, the maximum current reduction rate depends on the inductance of a primary coil and a turns ratio (i.e., between a primary and a secondary coil). For these embodiments, a maximum current reduction rate may in the range of 1 A/ms to 2.5 A/ms.

Figure 2:
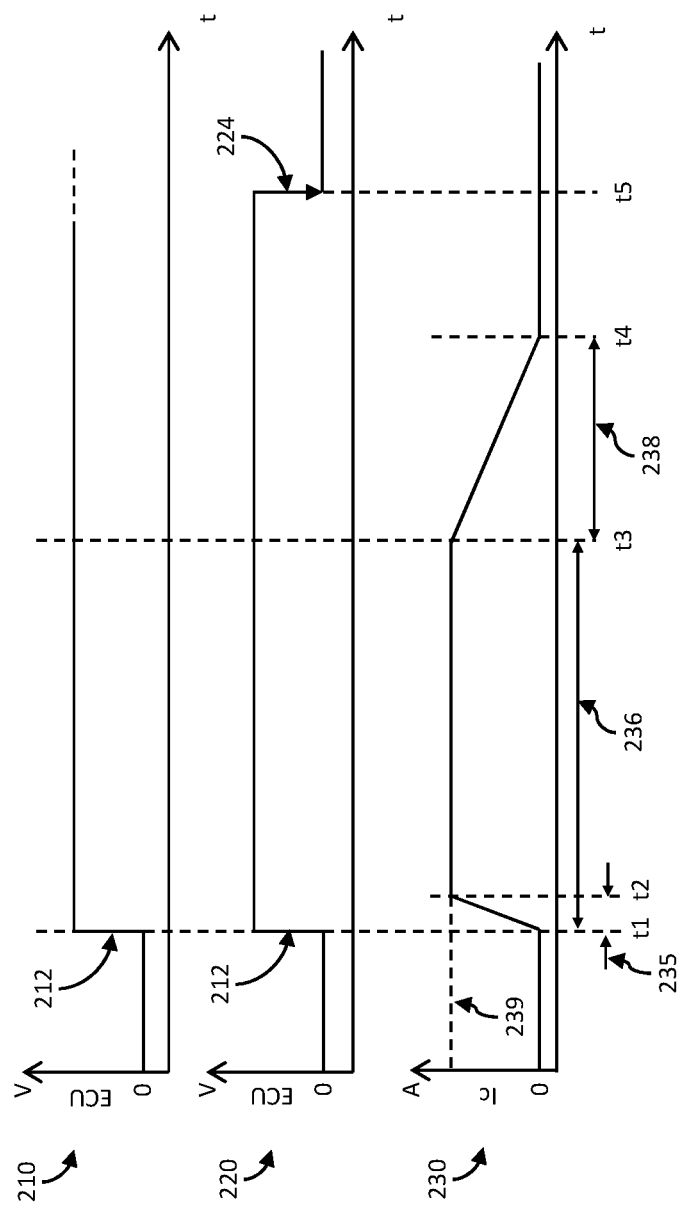
FIG. 2 schematically depicts signals in an ignition system.

FIG. 2 illustrates two possible ECU signal scenarios 210, 220 that cause a coil current, $I_C$, 230 to exceed an ODP 236. In both cases, at time, t1, a first trigger 212 (e.g., rising edge of a pulse) is received to start a charging a coil. During charging, the coil current 230 rises during a (brief) transient period 235 from time, t1, to time, t2 until it reaches a maximum current 239 set by the parameters of the circuit (e.g., coil resistance, switching device resistance, battery voltage, etc.). In the first ECU signal scenario 210, a second trigger to discharge the coil is never provided, while in the second ECU signal scenario 212, a second trigger 224 (e.g., falling edge of pulse) is provided at time, t5, which is much later than the ODP 236. In either of the ECU signal scenarios 210, 220, the coil current starts normally at time, t1 but is never triggered to stop flowing. The lack of a control signal could result in the coil current, $I_C$, remaining at its maximum value 239 for a time that exceeds a predetermined ODP 236 (e.g., predetermined as safe). Accordingly, a current controller may include circuits and/or devices that handle these scenarios by automatically configuring the switching device to reduce the coil current after the ODP 236. The coil current is reduced gradually according to a soft shut down period 238.

The two possible ECU signal scenarios are presented as examples, and the present disclosure is not limited to these particular examples. Rather, the present disclosure embraces all possible scenarios that require a coil current to be shut down gradually after some predetermined period. Accordingly, an aspect of the present disclosure is a circuit that controls a coil current to automatically turn off gradually over a soft shut down period after an over-dwell period has expired. In particular, the circuit disclosed provides independent control (i.e., adjustment) of the over-dwell period and of the soft shut down period. Further, this adjustment may occur in real time (e.g., based on a signal corresponding to an engine condition) or may be set once (e.g., factory set).

Figure 3:
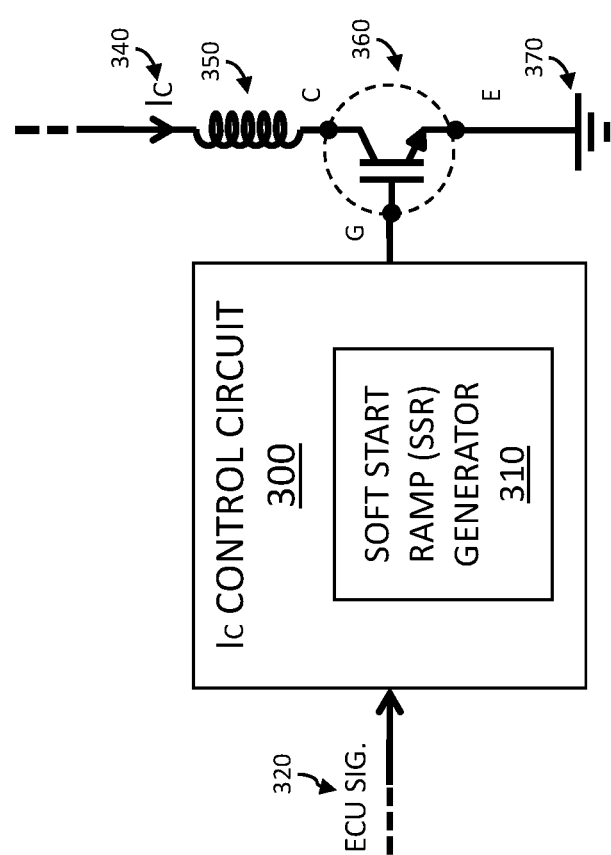
FIG. 3 is a block diagram that schematically depicts a system for controlling the current in a coil.

FIG. 3 includes is a block diagram of a system for controlling the current in a coil according to a possible embodiment of the present disclosure. The system includes a coil 350 and an insulated gate bipolar transistor 360 connected in series. The coil current, $I_C$, 340 may be adjusted by applying a signal to a terminal of the IGBT. For example, a gate (G) to emitter (E) voltage, $V_{GE}$, may control a collector (C) to-emitter (E) current, $I_{CE}$, according to a current versus voltage (I-V) characteristic of the IGBT (e.g., see FIG. 4, 415).

The system uses a coil-current control circuit (i.e., current control circuit, current controller, controller, etc.) 300 to apply a voltage to the gate of the IGBT in response to a signal from the ECU 320. For example, if the ECU signal 320 transitions from a relatively low voltage (i.e., logic low) to a relatively high voltage (i.e., logic high), then the current controller can provide a signal to drive (e.g., charge) the gate of the IGBT so that the IGBT transitions from an OFF state ($I_C$=0) to an ON state ($I_C$>0). Continuing the example, if the ECU signal 320 subsequently transitions from the logic high to the logic low, then the current controller 300 can drive (e.g., discharge) the gate (G) of the IGBT 360 so that the IGBT transitions from the ON state to the OFF state.

To prevent the IGBT 360 from remaining in the ON state long enough to cause damage, the control circuit 300 includes a soft-start ramp generator 310. The soft-start ramp generator produces a signal that when coupled to the gate of the IGBT allows the coil current to remain ON for an over-dwell period and then to shut OFF gradually. In other words, the voltage profile of the soft-start ramp signal (i.e., wave), when combined with the particular I-V characteristic of the IGBT, controls the coil current according to the $I_C$ profile 230 shown in FIG. 2.

Figure 4:
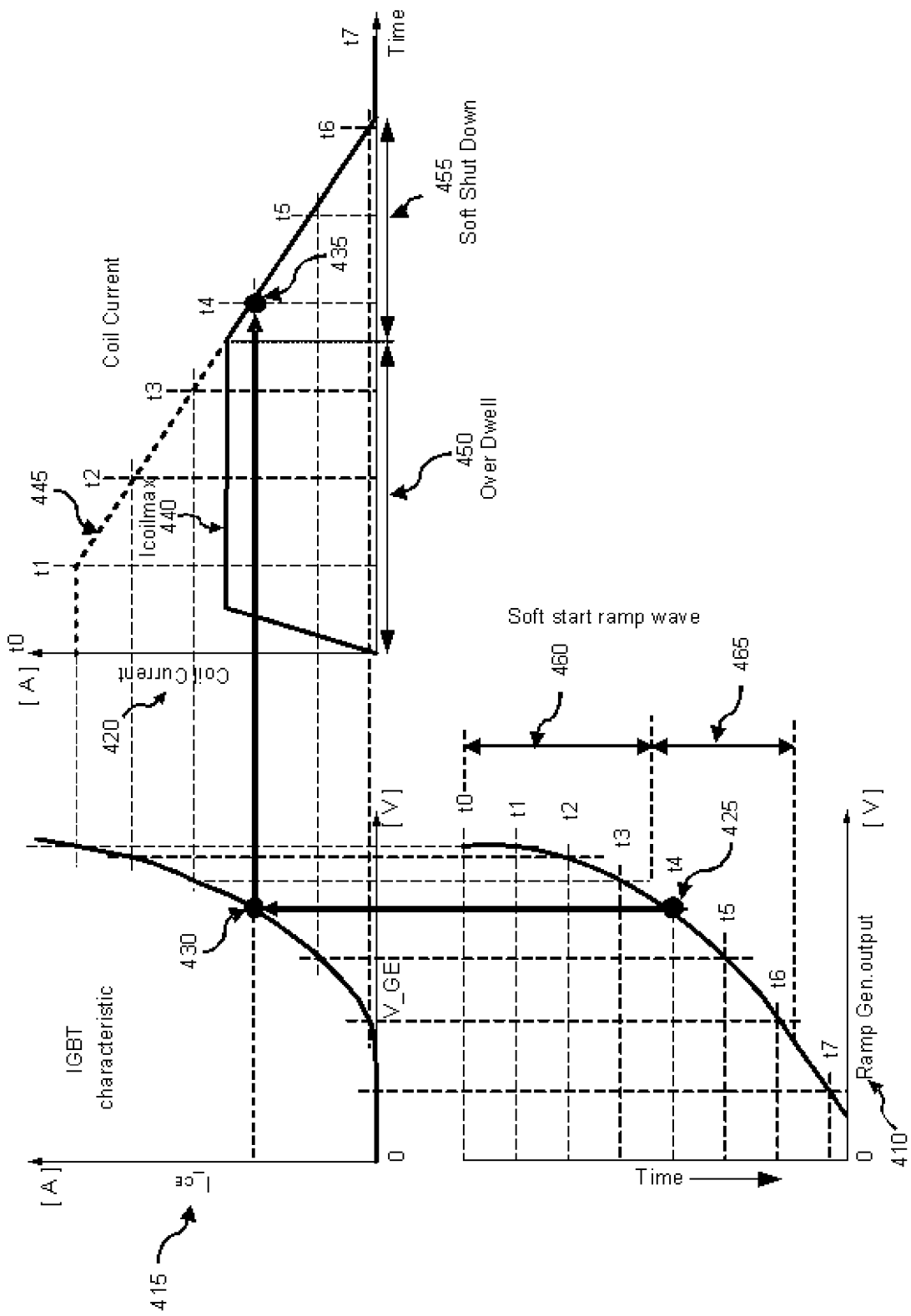
FIG. 4 shows three related graphs that illustrate the operation of controlling coil current.

The correspondence between a soft-start ramp signal 410, an I-V characteristic of the IGBT 415, and the coil current 420 is shown in FIG. 4. Referring to the coil current graph 420, at time, t0, an trigger signal causes the current controller 300 to turn the IGBT ON and the coil current 420 quickly rises to a maximum current ($I_{coilmax}$) 440. Referring to the ramp generator output graph 410, at the same time (t0) the soft-start ramp generator is started. The graphs are related by the graph 415 of collector-emitter current (ICE) versus gate-emitter voltage (VGE) that characterizes the IGBT (i.e., the I-V characteristic of the IGBT). The ramp generator output voltage corresponds to $V_{GE}$, the $V_{GE}$ corresponds to $I_{CE}$, and the $I_{CE}$ corresponds to $I_C$.

The soft-start ramp signal shown in the ramp generator output graph 410 derives its name from the period after t0 when the voltage nonlinearly declines from its initial value (i.e., the ramp voltage is slow to start its downward progression towards zero volts). The soft-start ramp signal is applied to the gate of an IGBT to produce a gate-emitter voltage, $V_{GE}$ that corresponds to a collector-emitter current ($I_{CE}$) according to the IGBT I-V characteristic 415. The collector-emitter current corresponds to the coil current 420 except when limited to $I_{coilmax}$ 440 by operating characteristics of the devices in the system (e.g., the resistance of the IGBT and/or the coil, battery voltage). Without these limitations, the coil current corresponding to the ramp signal would follow the dotted portion 445 of the coil current 420 profile.

To better understand the correspondence of the graphs shown in FIG. 4, the coil current for a selected time may be determined as an example. Starting at the ramp generator output graph 410, a time, t4, is selected. At the selected time (t4) the ramp generator output voltage 425 has fallen from its initial value. The ramp voltage 425 at t4 is applied to the gate of the IGBT and thus corresponds to a current 430 (i.e., $I_{CE}$ current) in the IGBT, which in turn, corresponds to a current (i.e., $I_C$) of the coil 435 at the selected time, t4.

A profile of the coil current is generated over time based on (i) the profile (i.e., shape) of the soft-start ramp generator signal (i.e., wave), (ii) the I-V characteristic profile of the IGBT, and (iii) the maximum coil current 440 supported by the IGBT/coil/battery voltage. The coil current profile includes an over dwell portion 450 and a soft shut down portion 455. For the example shown in FIG. 4. The over-dwell period can be controlled by how fast the ramp generator output voltage decreases in a first portion 460 (i.e., how $V_{GE}$ decreases $I_{CE}$ to a value corresponding to the maximum current in the coil, $I_{coilmax}$). Likewise, the soft shut down period (and shape) can by determined by the shape of the soft-start ramp generator signal 410 in a second portion 465 (i.e., how quickly the $V_{GE}$ is decreased to the threshold voltage of the IGBT).

Figure 5:
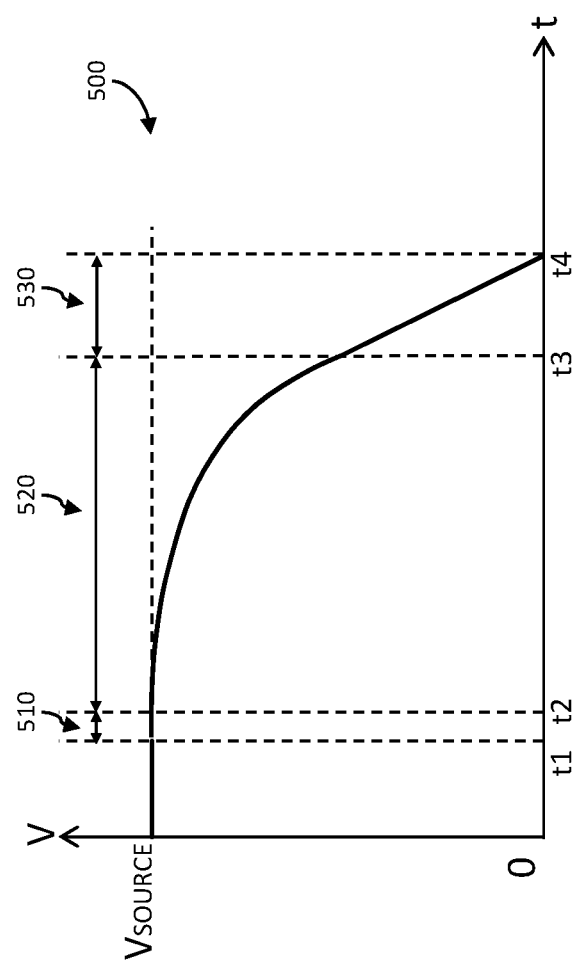
FIG. 5 is a graph of a soft-start ramp signal.

To achieve independent control over the over-dwell period and the soft shut down period, a soft-start ramp signal may be generated that can be divided into three main portions. An example of a soft-start ramp signal 500 is illustrated in FIG. 5. After the soft-start ramp signal is started at t1, the ramp remains substantially at its maximum value, $V_{SOURCE}$. In practice there may be a very small decrease in voltage during the substantially constant portion 510. This portion can allow the transients to settle and prevent sudden changes in the circuit before voltages begin to monotonically decrease. The substantially constant portion 510 typically has a relatively short duration compared to the overall duration of the ramp signal (e.g., <5%), but in some embodiments, the substantially constant portion 510 may be adjustable to extend the over-dwell period. After the substantially constant portion 510, the ramp signal begins a soft-start portion 520. During the soft-start portion the ramp signal decreases nonlinearly. The rate of decrease of the ramp signal at time, t2, is relatively slow compared to the rate of decrease of the ramp signal at time, t3. The change in the rate of decrease may be adjusted to control the over-dwell period. After the soft-start portion 520, a linear portion 530 begins at t3 and continues until the voltage reaches zero at t4. The time at which the linear portion begins (i.e., t3) and/or the slope of the linear portion may affect the soft shut down period. In some implementations, the linear portion begins sometime after the over-dwell period and during the soft shut down period of the coil current profile.

The linear portion ramp signal may result from limitations of the circuit generating the ramp signal. For example, the growing rate of voltage decrease of the soft start period may be limited to some maximum value. In this embodiment, the linear portion 530 begins when this limit is reached. In other embodiments, the linear portion 530 is not present, and the soft-start portion 520 extends until the voltage reaches zero. This is especially true for embodiments in which the substantially constant portion 510 is extended in time.

Figure 6:
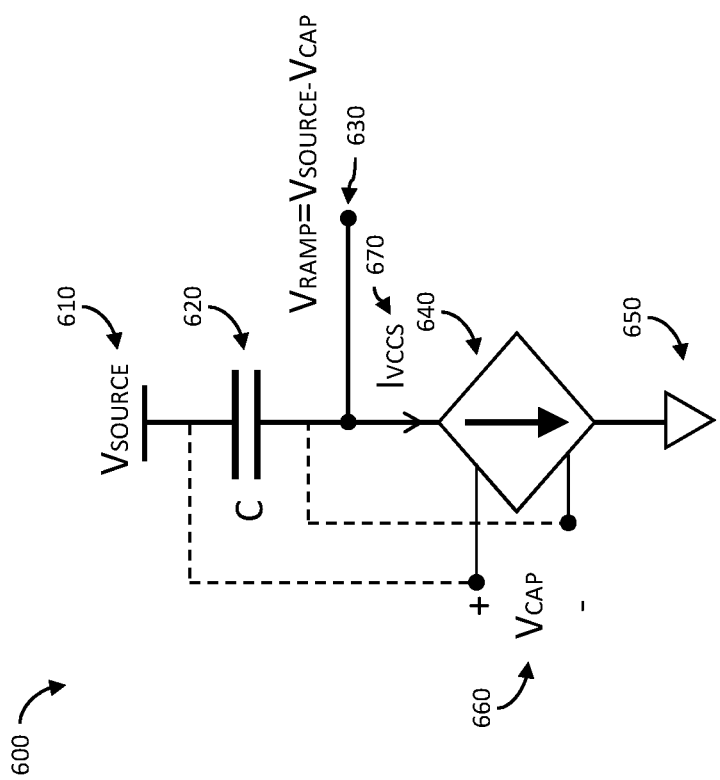
FIG. 6 schematically depicts a soft-start ramp generator circuit.

FIG. 6 depicts an example of soft-start ramp generator circuit 600 that is configured to generate a ramp signal that is the same, or similar, to ramp signal shown in FIG. 5. The circuit 600 includes a capacitor 620 that is coupled between a voltage source 610 ($V_{SOURCE}$) and a voltage controlled current source (VCCS) 640. The VCCS 640 is coupled between a low a ground voltage 650 (e.g., zero volts) and an output 630 of the circuit 600 where the capacitor 620 and the VCCS 620 are coupled together.

In operation, the capacitor is charged by the voltage source 610 according to a current ($I_{VCCS}$) 670 of the VCCS 640. During the charging, $I_{VCCS}$ is based on the voltage across the capacitor, $V_{CAP}$ 660. Thus, as the capacitor 620 is charged (i.e., as $V_{CAP}$ increases), the rate at which the capacitor is charged also increases (i.e., $I_{VCCS}$ increases). This configuration leads to a nonlinear increase of the voltage across the capacitor. Because the voltage at the output 630 is the source voltage ($V_{SOURCE}$) minus the voltage of the capacitor ($V_{CAP}$), the output voltage ($V_{RAMP}$) has the nonlinearly decreasing profile according to the soft-start ramp portion 520 of FIG. 5.

Figure 7:
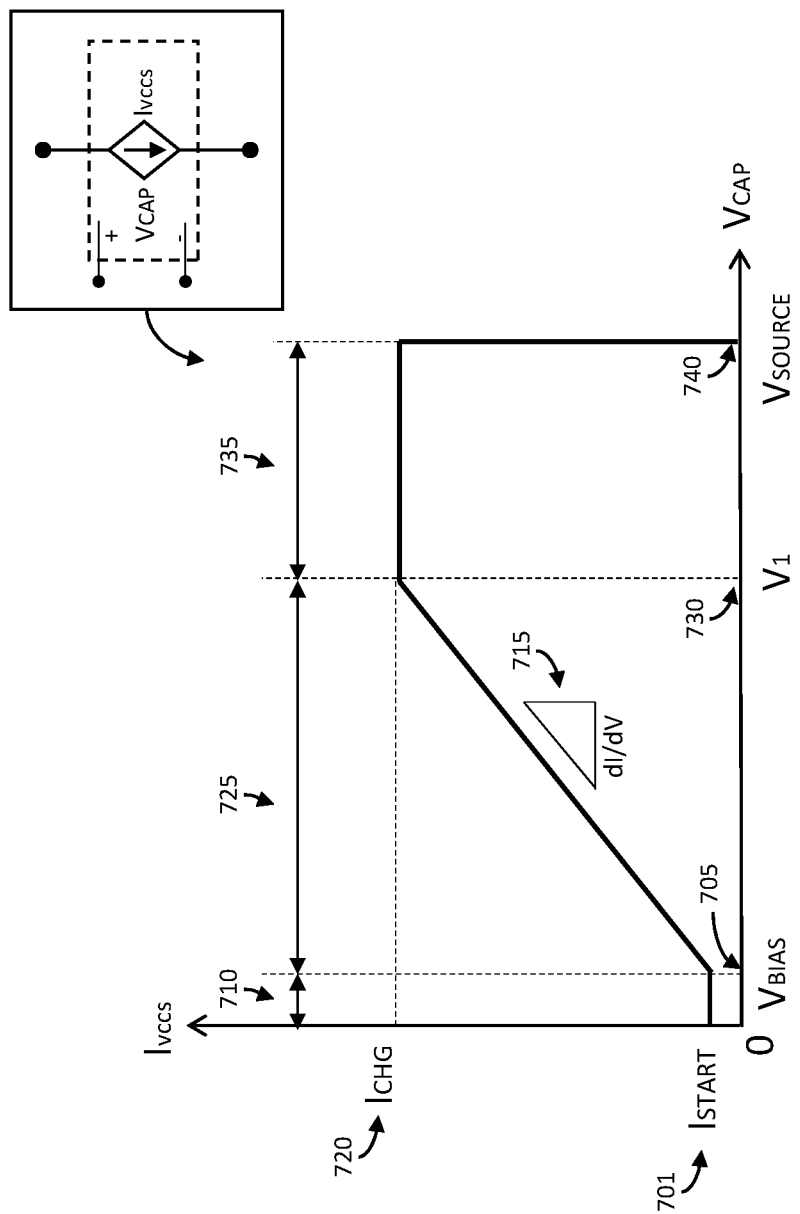
FIG. 7 is a graph illustrating the operating characteristics of a voltage controlled current source (VCCS).

In addition to the soft-start portion 520, the ramp signal at the output 630 may also include a substantially constant portion 510 and a linear portion 530 (see FIG. 5). Accordingly, VCCS may have different operating characteristics that depend on the voltage of the capacitor 660. A graph illustrating possible operating characteristics of the VCCS 640 is shown in FIG. 7.

When the soft-start ramp generator circuit is activated (e.g., receives a trigger signal at t0), a small current $I_{START}$ 701 flows to start charging the capacitor. In a first operating characteristic portion 710, the current of the VCCS is constant until the voltage of capacitor reaches a voltage, $V_{BIAS}$ 705. The time it takes for the capacitor to charge to this voltage depends on $I_{START}$ and $V_{BIAS}$, which can be adjusted in the VCCS. For example, $V_{BIAS}$ can be made relatively small so that the voltage across the capacitor does not significantly change during the period over which the capacitor is charged to $V_{BIAS}$. Accordingly, this period may correspond to the substantially constant portion 510 of the soft-start ramp signal ($V_{RAMP}$) shown in FIG. 5.

After the voltage of the capacitor, $V_{CAP}$, is charged above $V_{BIAS}$ 705, the VCCS exhibits a second operating characteristic portion 725 in which the output current ($I_{VCCS}$) depends (e.g., linearly) on the input voltage ($V_{CAP}$). For voltages in the range from $V_{BIAS}$ 705 to $V_1$ 730, $I_{VCCS}$ changes linearly from $I_{START}$ 701 to its maximum value $I_{CHG}$ 720. As $I_{VCCS}$ increases, $V_{CAP}$ increases, which in turn, increases $I_{VCCS}$. Thus, the capacitor is charged nonlinearly over time because a positive feedback loop is formed and the result of the positive feedback loop (i.e., $V_{CAP}$) grows nonlinearly.

The ramp signal ($V_{RAMP}$) at the output 630 of the ramp generator circuit 600 is $V_{SOURCE}-V_{CAP}$. Thus, as $V_{CAP}$ grows nonlinearly over time (i.e., until it reaches $V_{SOURCE}$), $V_{RAMP}$ decreases nonlinearly over time until it reaches to zero. The rates of voltage decrease (i.e., shape) of the ramp signal depends, at least, on the slope, dI/dV, 715 for the range of voltages between $V_{BIAS}$ 705 and $V_1$ 730. The period during which the voltages decrease over this range corresponds to the soft-start portion 520 of the ramp signal ($V_{RAMP}$), as shown in FIG. 5.

In some embodiments, the maximum current provided by VCCS is reached at a voltage, $V_1$ 730, which is less than the fully charged capacitor voltage of $V_{SOURCE}$ 740 (e.g., 55% of $V_{SOURCE}$). This creates a third operating characteristic portion 735 of the VCCS. For voltages ($V_{CAP}$) in the range of $V_1$ to $V_{SOURCE}$, the current provided by the VCCS is constant. During this mode of operation, the capacitor is charge linearly with time. Accordingly the voltage at the output of the ramp circuit declines linearly with time. Thus, the period during which the voltages at the output 630 decrease from $V_1$ to $V_{SOURCE}$ correspond to the linear portion 530 of the soft-start ramp signal ($V_{RAMP}$), as shown in FIG. 5.

A final operating characteristic of the VCCS occurs when the capacitor is fully charged (i.e., $V_{CAP}=V_{SOURCE}$). When the capacitor becomes fully charged, the output 630 of the ramp generator circuit reaches zero voltage (i.e., $V_{RAMP}=0$). Additionally, the voltage across the VCCS is zero. Thus, when $V_{CAP}$ reaches $V_{SOURCE}$ 740, the current $I_{VCCS}$ drops to zero 740 because VCCS cannot feed an output current in this condition (i.e., because the driver transistor of the current source cannot operate).

The shape of the ramp signal is thus adjustable by configuring the characteristics of the VCCS. For example, one or more of the parameters $I_{START}$ 701, $I_{CHG}$ 720, $V_{BIAS}$ 705, and $V_1$ 730, $V_{SOURCE}$ 740 may be controlled to adjust the shape of the soft-start ramp signal. Because the shape of the soft-start ramp signal contributes to the profile of the coil current, a particular set of values for these parameters may be derived to generate a coil current profile having a particular over-dwell period and a particular soft shut down period.

Thus, an aspect of the disclosed circuits and methods is a ramp generator circuit with a ramp signal output that is based on a voltage across a capacitor charged by a VCCS. Another aspect of the disclosed circuits and methods is an output of the VCCS is controlled by the voltage across the capacitor with respect to an operating characteristic profile of the VCCS, and a portion of the operating characteristic profile linearly increases the current charging the capacitor based on the voltage across the capacitor.

Figure 8:
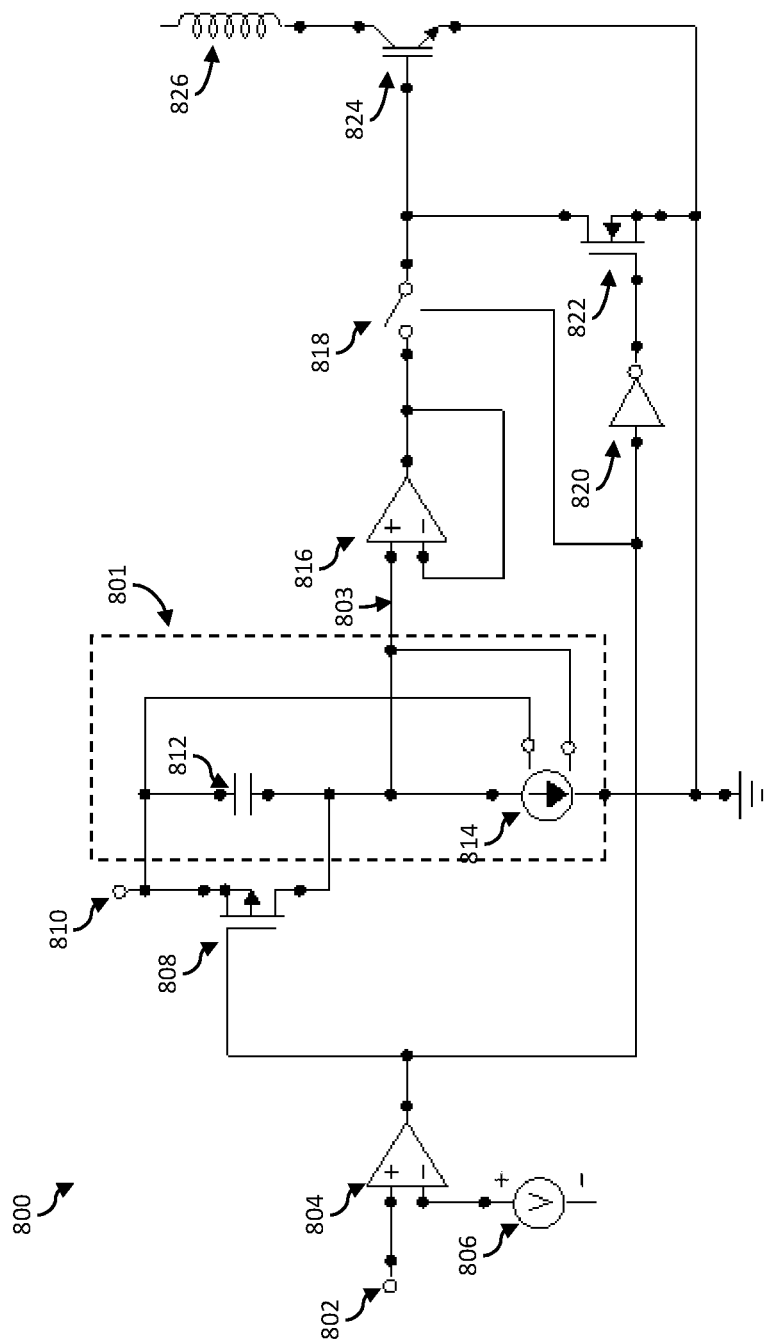
FIG. 8 schematically depicts circuit for controlling a current in a coil.
Figure 9:
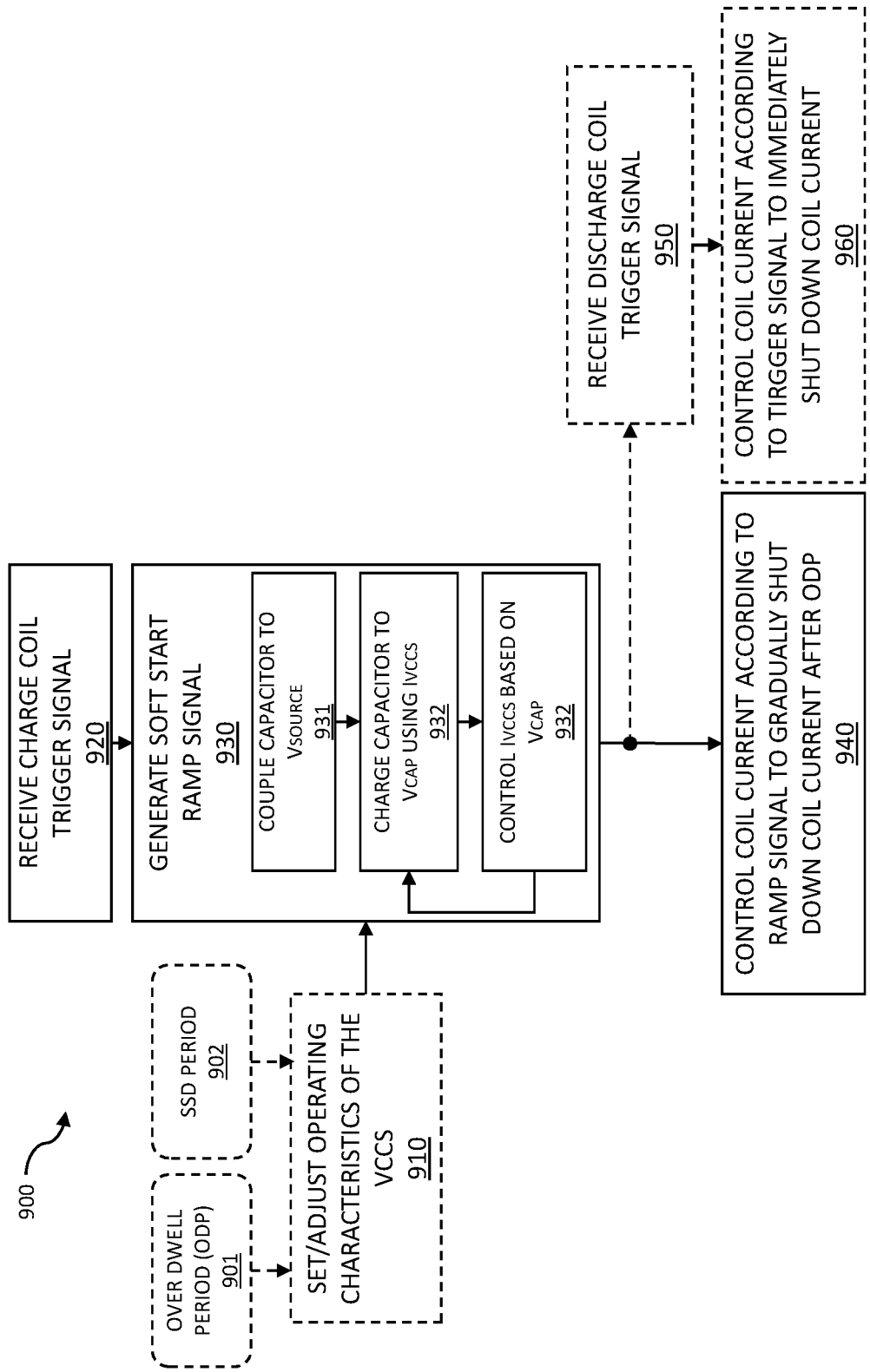
FIG. 9 is a flow chart of a method for controlling a current in a coil.

A possible embodiment of a current control circuit 800 that includes the soft-start ramp generator circuit 801 as described previous is shown in FIG. 8. The soft-start ramp generator circuit 801 includes a capacitor 812 in series with a VCCS 814. The current of the VCCS 814 charges the capacitor to a source voltage 810 when a trigger signal (e.g., a rising edge of pulse transitioning from a lower voltage level to a higher voltage level) is received at an input 802. Additionally, a voltage across the capacitor 812 and the operating characteristics of the VCCS 814 (i.e., at the voltage across the capacitor) determine the current output of VCCS.

The current control circuit 800 further includes a non-inverting amplifier 816. The ramp signal at the output 803 of the ramp generator circuit 801 (i.e., the node between the capacitor 812 and the VCCS 814) is fed to the non-inverting amplifier 816. The non-inverting amplifier 816 may be embodied in various ways including (but not limited to) an operational amplifier configured as a buffer amplifier (e.g., with unity gain). The non-inverting amplifier 816 functions to prevent loading issues on the ramp generator circuit and to provide sufficient current to drive a gate of a switching device.

The switching device of the current control circuit 800 may be any switching device for which a current between a first and a second terminal can be controlled by a signal at a third terminal. An IGBT 824 is used in the embodiment shown in FIG. 8. The IGBT 824 is connected at its gate to the output of the non-inverting amplifier 816, at its emitter to a ground voltage, and at its collector to a coil 826. Accordingly, the ramp signal at the output of the non-inverting amplifier can control $V_{GE}$ of the IGBT to adjust the current flowing through the coil (i.e., $I_{CE}$ of the IGBT).

The current control circuit 800 further includes a network of switching devices and gate control electronics to control the start of the ramp generator circuit and to control the charging and discharging of the coil 826. A differential amplifier 804 may be used at the input 802 of the current control circuit 800 to compare an input voltage to a reference voltage 806. Based on this comparison, the differential amplifier 804 can output a lower voltage or a higher voltage to control the network of switching devices.

The network of switching devices may include a ramp-circuit switching device 808. The ramp-circuit switching device 808 may be embodied as a p-channel metal oxide semiconductor (i.e., PMOS) transistor having a gate connected to the output of the differential amplifier 804, a source coupled to the source voltage 810, and a drain connected to the output of the ramp generator circuit 801. In other words, the PMOS is be connected in parallel with the capacitor to short circuit the capacitor when in an ON state (i.e., prevent the capacitor from charging). In operation, a trigger signal that transitions from a lower voltage to a higher voltage at the input 802 of the current control circuit 800 may cause the PMOS to transition from an ON state to an OFF state to allow the capacitor 812 of the ramp generator circuit 801 to begin charging.

The network of switching devices may further include a gate switching device 818 to electrically couple the output of the ramp generator circuit 801 to the gate of the IGBT 824 (e.g., via the non-inverting amplifier 816). The gate switching device may be embodied as a transistor (e.g., n-channel metal oxide semiconductor transistor (NMOS)) having its gate coupled to the input of the current control circuit (e.g., via the differential amplifier 804) so that when a trigger signal that transitions from low to high is received at the input the gate switching device 818, the IGBT 824 is coupled to the ramp generator circuit 801 (e.g., via the non-inverting amplifier 816).

The network of switching devices may further include a hard shut down switch 822. The hard shut down switch may be embodied in various ways including (but not limited to)

a NMOS transistor 822 as shown in FIG. 8. The hard shut down transistor 822 may be coupled at a gate terminal to the input of the current control circuit 800 via an inverter 820 and via the differential amplifier 804. The NMOS transistor 822 maybe coupled at its drain to the gate of the IGBT 824 and coupled at its source to a ground voltage. In other words, the hard shut down switch 822 may pull the gate-emitter voltage ($V_{GE}$) of the IGBT to the ground voltage when turned to an ON state. The pull-down of $V_{GE}$ turns the IGBT to an OFF state and stops (e.g. abruptly stops) current from flowing in the coil 826.

In operation, a trigger signal at the input 802 of the current control circuit 800 that transitions from a lower voltage to a higher voltage places the hard shut down transistor 822 in an OFF state, effectively decoupling it from the circuit and allowing the coil to be charged (i.e., through the IGBT that is turned ON by the gate switching device 818). If a subsequent trigger signal is received a the input 802 that transitions from the higher voltage back to the lower voltage, then the hard shut down transistor is turned ON, thereby turning OFF the IGBT and shutting down the coil current according to a hard shut down profile as described previously. If the subsequent trigger is not received, then the hard shut down transistor remains off and the coil current is controlled by the ramp generator circuit 801 to shut down gradually (i.e., softly) after an over-dwell period.

The principles and techniques described can be applied as a method for controlling a current in a coil. The method 900 begins by receiving 920 a charge coil trigger signal. This signal can be generated by a coil controller circuit or may be received from another circuit or system. For example, in a vehicle the charge coil trigger signal may be received from an engine control unit (ECU). The charge coil trigger signal may be embodied as a change in a voltage or a current. The change may be embodied in various ways including (but not limited to) a change in amplitude. For example, the charge coil trigger signal may be embodied as a voltage transition from a lower voltage (e.g., a logical low level) to a higher voltage (e.g., a logical high level).

After receiving 920 the charge coil trigger signal, a soft-start ramp signal is generated 930. The soft-start ramp signal may be a voltage signal that gradually decreases from a starting value (e.g., VSOURCE) to an ending value (e.g., a ground voltage) over a period of time (e.g., an over-dwell period plus a soft shut down period). For generating 930 the soft-start ramp signal, the method may include coupling 931 coupling capacitor to a source voltage ($V_{SOURCE}$), and charging 932 the capacitor using an output current ($I_{VCCS}$) from a VCCS. The soft-start ramp signal is related to the voltage across the capacitor ($V_{CAP}$) as it charges. To generate a soft-start ramp signal that has a shape that gradually decreases the output current ($I_{VCCS}$) is controlled 932 by the voltage across the capacitor ($V_{CAP}$).

The control of the output current ($I_{VCCS}$) based on the voltage of the capacitor ($V_{CAP}$) depends on the operating characteristics (e.g., the I-V profile) of the VCCS. In some embodiments operating characteristics, such as the slope of the output current $I_{VCCS}$ versus the capacitor voltage ($V_{CAP}$), or a minimum output current ($I_{START}$) or a maximum output current ($I_{CHG}$), may be set and/or adjusted 910 to match a desired over-dwell period (ODP) 901 or a desired soft shut down (SSD) period 902. The setting and/or adjusting operation may control the ODP and the SSD period independently and may occur once, periodically, or as needed. For example, an ECU may determine a new ODP (e.g., to match an engine condition) and adjust a characteristic (e.g., $V_{BIAS}$) of the VCCS so that the generated soft-start ramp signal results in the new ODP.

After the soft-start ramp signal is generated 930, it is used to control 940 an operating point of the IGBT (e.g., according to the characteristic curve of the IGBT). The operating point of the IGBT determines the current through the IGBT and because the IGBT is in series with a coil, the current through the coil. In some embodiments, the current through the coil may be limited (i.e., clamped) to a maximum value (e.g., due to the coil resistance) that is lower than the operating point of the IGBT could otherwise support.

What results from the soft-start ramp signal controlling the current through the IGBT, is a coil current with a profile (i.e., current vs. time) that rises quickly to a maximum value, at which it remains until the end of the ODP. After that time, the coil current gradually (e.g., linearly) decreases until it reaches zero, which occurs at the conclusion of a soft-shut down period. This current profile starts when the first trigger signal is received so that if no subsequent trigger signal is received, the coil can be safely discharged.

In some embodiments, if a subsequent trigger signal (e.g., discharge coil trigger signal) is received 950 (e.g., before the conclusion of the ODP) then the control of the coil current by the soft-start ramp is concluded and the coil current is immediately shut down 960. For example, in normal operation of an ignition system, the control of the coil current by the soft-start ramp signal has no affect because the discharge coil trigger is received before the ODP has elapsed and the immediate shut down of the coil current (i.e., hard shut down (HSD)) results in a spark (e.g., at a time corresponding the to discharge coil trigger signal).

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms.

It will be understood that, in the foregoing description, when an element, such as a component is referred to as connected to, electrically connected to, coupled to, or electrically coupled to another element, it may be directly connected or coupled to the other element, or one or more intervening elements may be present. In contrast, when an element is referred to as being directly connected to or directly coupled to another element there are no intervening elements or layers present. Although the terms directly connected to or directly coupled to may not be used throughout the detailed description, elements that are shown as being directly on, directly connected or directly coupled can be referred to as such. The claims of the application, if any, may be amended to recite exemplary relationships described in the specification or shown in the figures.

Some described elements may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

The invention claimed is:

1. A soft-start ramp generator, comprising:
a capacitor; and
a voltage controlled current source configured to generate an output current according to a plurality of operating characteristics based on a voltage across the capacitor, wherein the output current generated by the voltage controlled current source is configured to charge the capacitor such that when the capacitor is charged, the voltage controlled current source generates the output current according to each of the plurality of operating characteristics.

2. The soft-start ramp generator according to claim 1, wherein the plurality of operating characteristics includes:
a first operating characteristic wherein the output current is a first current while the voltage across the capacitor is charged form a zero voltage to a first voltage.

3. The soft-start ramp generator according to claim 2, wherein the plurality of operating characteristics includes:
a second operating characteristic wherein the output current is increased linearly from the first current to a second current while the voltage across the capacitor is charged from the first voltage to a second voltage.

4. The soft-start ramp generator according to claim 3, wherein the plurality of operating characteristics includes:
a third operating characteristic wherein the output current is the second current while the voltage across the capacitor is charged from the second voltage to a maximum voltage.

5. The soft-start ramp generator according to claim 4, wherein the voltage controlled current source generates the output current according to the first operating characteristic, the second operating characteristic, and the third operating characteristic in succession as the capacitor is charged.

6. The soft-start ramp generator according to claim 5, wherein the voltage across the capacitor corresponds to a soft-start ramp signal that includes:
a substantially constant portion corresponding to the first operating characteristic;
a soft-start portion corresponding to the second operating characteristic; and
a linear portion corresponding to the third operating characteristic.

7. The soft-start ramp generator according to claim 6, wherein the substantially constant portion begins at a maximum voltage of the soft-start ramp signal.

8. The soft-start ramp generator according to claim 6, wherein a duration of the substantially constant portion is less than five percent (5%) of an overall duration of the soft-start ramp signal.

9. The soft-start ramp generator according to claim 6, wherein the soft-start portion decreases from a voltage at an end of the substantially constant portion according to a rate of decrease that changes over a duration of the soft-start portion.

10. The soft-start ramp generator according to claim 9, wherein the rate of decrease at a start of the soft-start portion is less than the rate of decrease at an end of the soft-start portion.

11. The soft-start ramp generator according to claim 9, wherein the rate of decrease corresponds to a slope of the second operating characteristic.

12. The soft-start ramp generator according to claim 6, wherein the linear portion decreases linearly from a voltage at an end of the soft-start portion to zero volts.

13. The soft-start ramp generator according to claim 1, wherein:
the capacitor is coupled between the voltage controlled current source and a source voltage; and
the soft-start ramp generator is configured to output a soft-start ramp signal at an output node between the voltage controlled current source and the capacitor.

14. A method for generating a soft-start ramp signal, the method comprising:
charging a voltage across a capacitor with an output current from an output of a voltage controlled current source;
applying the voltage across the capacitor to an input of the voltage controlled current source so that the voltage controlled current source is configured to generate the output current according to a plurality of operating characteristics as the voltage across the capacitor is charged; and
generating the soft-start ramp signal based on the voltage across the capacitor.

15. The method according to claim 14, wherein the plurality of operating characteristics includes:
a first operating characteristic wherein the output current is a first current while the voltage across the capacitor is charged from a zero voltage to a first voltage;
a second operating characteristic wherein the output current is increased linearly from the first current to a second current while the voltage across the capacitor is charged from the first voltage to a second voltage; and
a third operating characteristic wherein the output current is the second current while the voltage across the capacitor is charged from the second voltage to a maximum voltage.

16. The method according to claim 15, wherein the voltage controlled current source is configured to generate the output current according to the first operating characteristic, the second operating characteristic, and the third operating characteristic in succession as the capacitor is charged.

17. The method according to claim 15, wherein the soft-start ramp signal includes:
a substantially constant portion corresponding to the first operating characteristic that begins at a maximum voltage of the soft-start ramp signal;
a soft-start portion corresponding to the second operating characteristic that decreases from a voltage at an end of the substantially constant portion according to a rate of decrease that changes over a duration of the soft-start portion; and a linear portion corresponding to the third operating characteristic that decreases linearly from a voltage at an end of the soft-start portion to zero volts.

18. The method according to claim 17, wherein a duration of the substantially constant portion is less than five percent (5%) of an overall duration of the soft-start ramp signal.

19. The method according to claim 17, wherein the rate of decrease at a start of the soft-start portion is less than the rate of decrease at an end of the soft-start portion.

20. The method according to claim 19, wherein the rate of decrease corresponds to a slope of the second operating characteristic.

* * * * *